United States Patent [19]
Gilliland et al.

[11] Patent Number: 5,296,657
[45] Date of Patent: Mar. 22, 1994

[54] METHOD OF SOUND-DEADENING FOR VEHICLES

[75] Inventors: Robert J. Gilliland, W. Willington, Conn.; Earl A. Williams, Stevensville, Mich.

[73] Assignee: USM Corporation, Wilmington, Mass.

[21] Appl. No.: 48,846

[22] Filed: Apr. 16, 1993

[51] Int. Cl.$^5$ .................... E04B 1/84; B32B 5/06
[52] U.S. Cl. .................... 181/294; 181/296; 428/297; 428/340
[58] Field of Search .......... 181/286, 290, 294, 296; 428/284, 288, 297, 340

[56] References Cited

U.S. PATENT DOCUMENTS 4,851,283  7/1989  Holtrop et al. ............ 181/294 X
5,068,001 11/1991  Haussling ................. 181/290 X

*Primary Examiner*—Michael L. Gellner
*Assistant Examiner*—Khanh Dang

[57] ABSTRACT

For under hood sound-deadening of vehicles a molded sheet (14) of impregnated non-woven fabric sheet material having a weight in the range 0.5 to 0.75 kg/m$^2$ and a density in the range of 350 to 425 kg/m$^3$ is used. The material includes a blend of polyester staple fibers having an average decitex in the range 2.5 to 4.0 dtex typically 3.2 dtex. The impregnant includes 10 to 35% by dry weight carboxylated styrene-butadiene copolymer in which the styrene content is not less than 55%, 5 to 10% by dry weight carboxylated styrene-butadiene copolymer in which the styrene content is not more than 50%, 50 to 70% by dry weight mineral filler, and up to 3.5% by dry weight melamine formaldehyde resin. Pigment may also be added. The fabric sheet material is preferably clipped to the hood underside to provide a small air gap between the material and the hood, but alternatively the sheet material may be bonded by adhesive to the hood underside.

20 Claims, 4 Drawing Sheets

METHOD OF SOUND-DEADENING FOR VEHICLES

BACKGROUND TO THE INVENTION

This invention is concerned with a method of deadening sound in metallic panels and particularly deadening sound of the components of vehicles, especially under hood sound deadening in automobiles.

In order to prevent the passage of noise especially from beneath the hood of a vehicle into the passenger compartment it has been conventional practice in recent years to secure to a layer of fiberglass material in sheet form on the under side of an automobile hood. Apart from now perceived potential problems in working with fiberglass, the layer of fiberglass required was relatively heavy, typically in the range 1.0 to 1.5 kg/m$^2$. It sagged and tended to tear fairly easily, especially where it was attached to the metal. Moreover, although the sound deadening qualities of fiberglass material were sufficient to meet the specifications laid down, the material had a number of disadvantages, especially in that it did not mold readily to the shape of the under side of the hood.

OBJECT OF THE INVENTION

It is thus one of the various objects of the present invention to provide an improved method deadening sound of metal sheets, especially under hood sound deadening of vehicles, particularly automobiles, wherein a lighter material which is more readily moldable is used without any deterioration in the standard of sound-deadening achieved.

SUMMARY OF THE INVENTION

There now follows, to illustrate the present invention by way of example, a method of sound deadening for metallic parts, especially those found in vehicles and particularly under hood sound deadening in an automobile, hereinafter referred to as the illustrative method. In carrying out this illustrative method with exemplary reference to under hood sound deadening in an automobile, instead of the known fiberglass material, a layer of impregnated non-woven fabric sheet material is used, which is molded to conform to the shape of the underside of the hood prior to being secured thereto.

More particularly, in this illustrative method, the non-woven fabric sheet material has a weight in the range 0.5 to 0.7 kg/m$^2$ and a density in the range 350 to 425 kg/m$^3$, and comprises a blend of polyester staple fibers having an average decitex (dtex) in the range 2.5 to 4.0 dtex; more particularly the material comprises polyester staple fibers of 1.5 to 5 dtex with an average decitex of 3.2 dtex.

The impregnant of the fabric sheet material used in carrying out the illustrative method comprises: 10 to 35% by dry weight carboxylated styrene-butadiene copolymer in which the styrene content is not less than 55%, 5 to 10% by dry weight carboxylated styrene-butadiene copolymer in which the styrene content is not more than 50%, and 50 to 70% by dry weight mineral filler.

More particularly, the impregnant comprises: 20 to 30% by dry weight carboxylated styrene-butadiene copolymer in which the styrene content is not less than 55%, 5.5 to 7.5% by dry weight carboxylated styrene-butadiene copolymer in which the styrene content is not more than 50%, and 60 to 70% by dry weight mineral filler. Thus, the impregnant of a particular material may comprise 25.7% by weight carboxylated styrene-butadiene polymer in which the styrene content is not less than 55%, 6.5% by weight carboxylated styrene butadiene polymer in which the styrene content is not more than 50%, and 65% mineral filler.

The impregnant may also comprise a suitable pigment, the quantity of which will depend upon its color. In addition the impregnant may comprise up to 3.5% by weight melamine formaldehyde resin. This latter reacts with the carboxylated styrene-butadiene polymers firstly to enhance the water resistance (water repellency) of the material and additionally to enhance its shape-retention by reducing its thermoplasticity.

The fabric sheet material itself, prior to impregnation, has a weight in the range 0.25 to 0.325 kg/m$^2$ and a thickness in the range 1.0 to 1.65 mm. The preferred thickness is 1.5 mm.

With regard to the mineral filler used, clay has been found to be advantageous. The material as a whole is suitable for replacing fiberglass not only in that it does not contain glass, but also in that it exhibits better tear strength and tensile strength, it is more resistant to cutting and puncturing, and furthermore it thermoforms (conforms to desired shapes using heat) more successfully than fiberglass. With regard to its sound deadening properties, the material used in the illustrative method provides better sound deadening than fiberglass. It has been found that the use of an air gap between the fabric and the metal is desirable using the material in accordance with the illustrative method. It has furthermore been found that this material has a burn rate of approximately 1.25 cm. per minute which is well within the specification laid down (i.e. 10 cm. per minute). Moreover, the material has been found to maintain its integrity in oil and fuel atmospheres, it appears not to be affected by windshield wash fluid and has generally been found resistant to staining. Using this material, furthermore, the overall weight of the sheet used can be some 50% of that of conventional fiberglass material.

The invention provides, in one of its several aspects, a method of under hood sound deadening in an automobile comprising securing to an underside of the automobile hood a layer of impregnated nonwoven fabric sheet material having a weight in the range 0.5 to 0.75 kg/m$^2$ and a density in the range 35 to 425 kg/m$^3$, wherein the fabric material comprises a blend of polyester staple fibers having an average decitex in the range 2.5 to 4.0 dtex and wherein the impregnant comprises: 10 to 35% by dry weight carboxylated styrene-butadiene copolymer in which the styrene content is not less than 55%, 5 to 10% by dry weight carboxylated styrene butadiene copolymer in which the styrene content is not more than 50%, and 50 to 70% by dry weight mineral filler.

BRIEF DESCRIPTION OF THE DRAWINGS

There now follows a detailed description, to be read with reference to the accompanying drawings, of the illustrative method. It will of course be appreciated that this illustrative method has been selected merely by way of being exemplary of the invention and not by way of limitation thereof.

In the accompanying drawings.

DESCRIPTION OF THE PREFERRED EMBODIMENT

Figure 1:
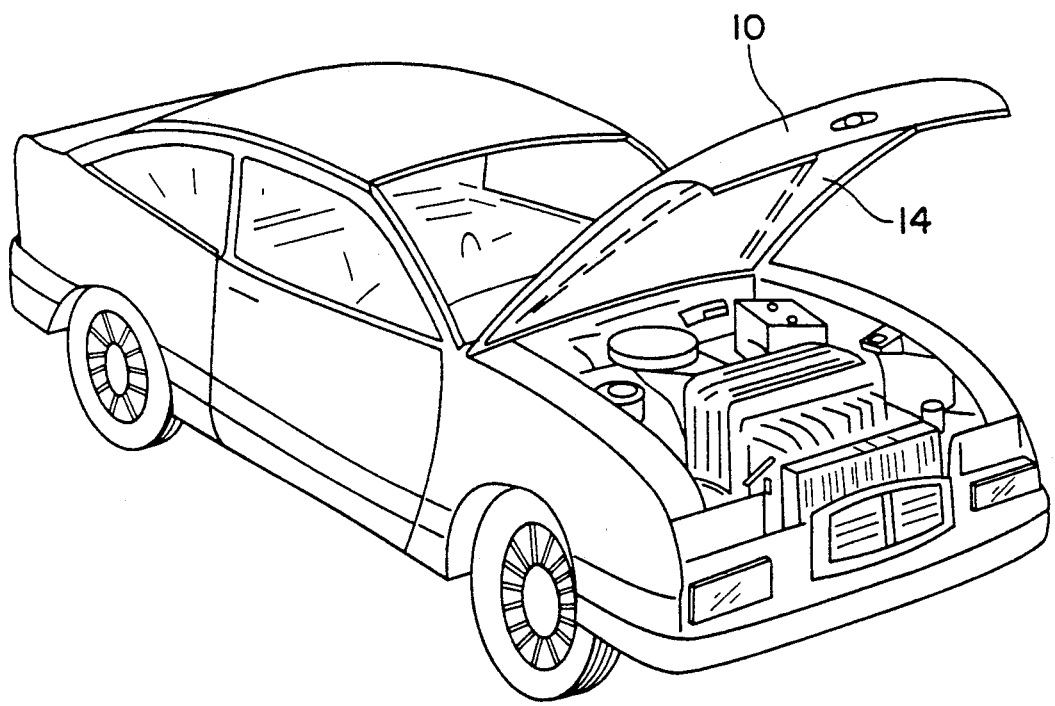
FIG. 1 is a perspective view of an automobile with its hood open, showing a sound-deadening sheet material secured to the underside thereof.
Figure 2:
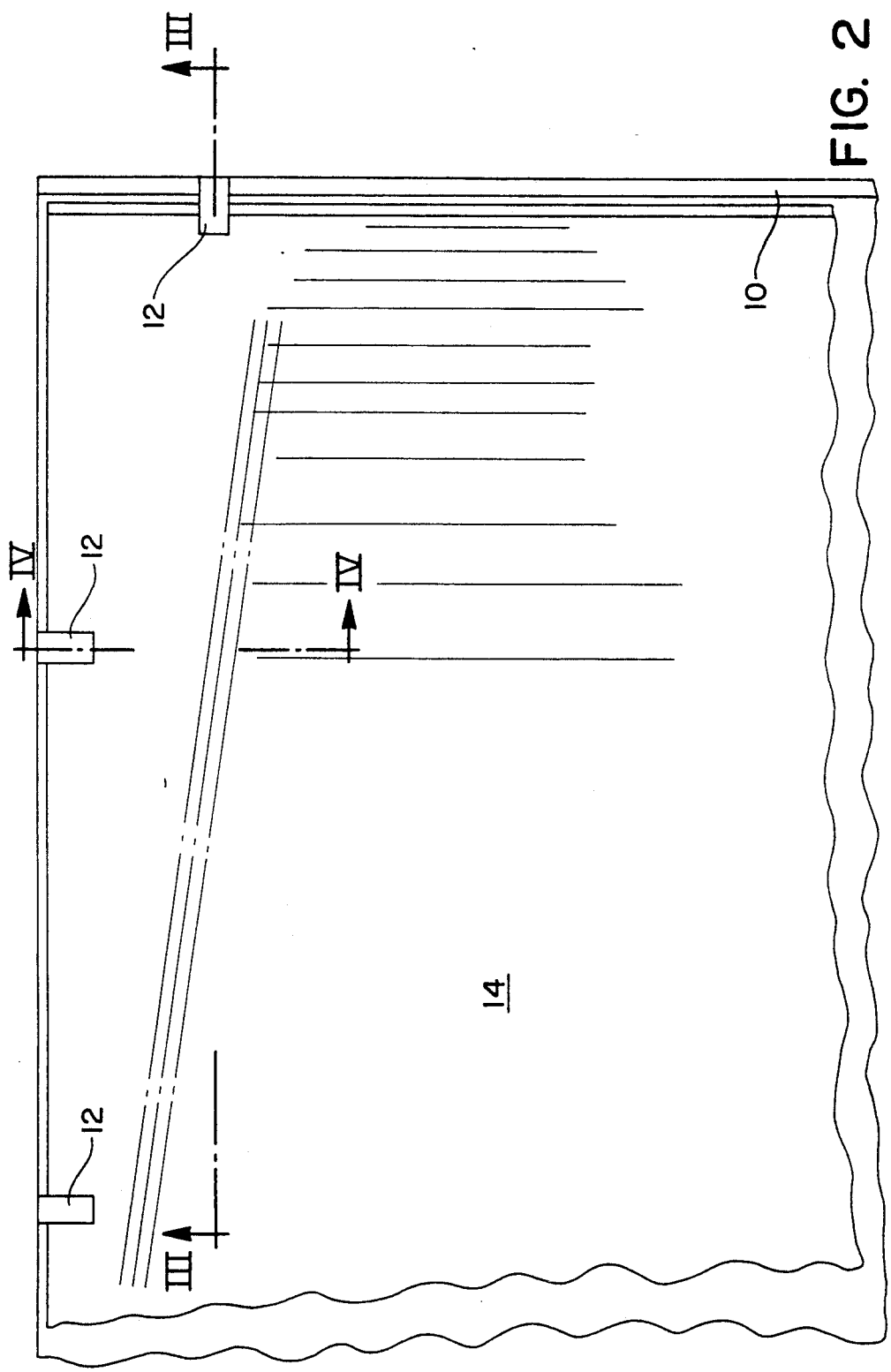
FIG. 2 is an underneath plan view of a portion of the hood of the automobile shown in FIG. 1.
Figure 3:
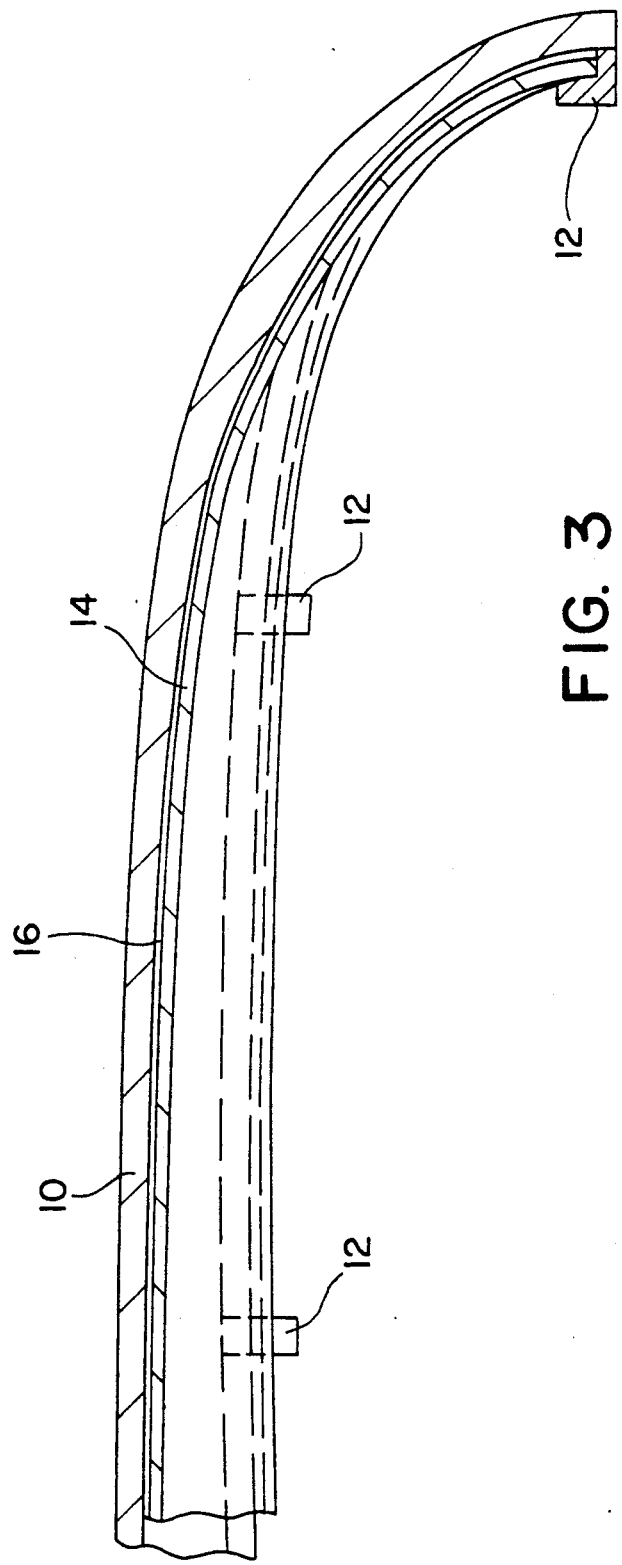
FIG. 3 is a section view taken along the line III—III of FIG. 2.
Figure 4:
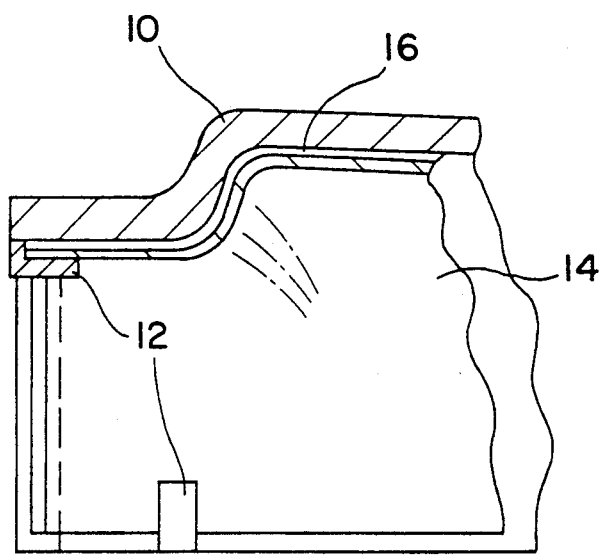
FIG. 4 is a section view taken along the line IV—IV of FIG. 2, showing a molded section of the material used in the illustrative method.

The illustrative method now to be described relates to under hood sound-deadening in an automobile. To this end, secured to the underside of the automobile hood 10, by means of a plurality of clips 12 spaced apart from one another around the periphery of the hood 10, is a molded sheet 14 of sound deadening material. As can be seen particularly from FIGS. 3 and 4, this sheet is held spaced from the surface of the underside of the hood 10 by a small air gap 16. Alternatively, however, the sheet material 14 may be bonded by adhesive to the surface of the underside of the hood.

The sheet material 14 has a thickness in the order of 1.5 mm. and has a dry weight in the order of 0.6 kg/m$^2$, although other materials may be used having a thickness in the range 1.0 to 1.65 mm., a weight in the range 0.5 to 0.7 kg/m$^2$ and a density in the range 350 to 425 kg/m$^3$. As can be seen from FIGS. 3 and 4, moreover, the fabric sheet material 14 is molded to conform to the shape of the underside of the hood, and such molding is effected prior to the material 14 being secured to the hood.

The fabric sheet material 14 comprises a blend of polyester staple fibers of 1.5 to 5 dtex, with an average decitex of 3.2 dtex, but other materials having an average decitex in the range 2.5 to 4.0 dtex may be used. The fabric sheet material 14, which has a weight, prior to impregnation, in the range 0.25 to 0.325 kg/m$^2$ is impregnated with an impregnant which comprises:

| | % of Total Weight of Impregnant |
|---|---|
| Carboxylated styrene-butadiene in which the styrene content is 59% | 25.40 |
| Carboxylated styrene-butadiene in which the butadiene content is 50% | 6.47 |
| Clay | 64.00 |
| Melamine formaldehyde resin | 2.27 |
| Pigment (typically) | 1.86 |

The impregnant is impregnated into the fabric which has an initial weight of 0.26 kg/m$^2$. Because the impregnation is effected in a liquid form, the fabric tends to shrink and the final weight of the fabric is thus in the order of 0.27 kg/m$^2$.

Although clay has been found to be a suitable mineral filler, other mineral fillers, e.g. talc, may be used. It should also be noted that the quantity of pigment will depend upon the color required.

In using such a material, a sheet is initially cut to the desired size and is then molded to the shape of the underside of the hood to which it is to be attached. It has been found that the material shows little or no tendency to lose its molded shape under operating conditions of the automobile.

It is apparent that modifications and changes can be made within the spirit and scope of the present invention but it is our intention, however, to be limited only by the scope of the appended claims.

As our invention we claim:

1. A method of sound-deadening a metallic sheet comprising:
   securing to one side of said metallic sheet a layer of impregnated non-woven fabric sheet material having a weight in the range 0.5 to 0.75 kg/m$^2$ and a density in the range 35 to 425 kg/m$^3$,
   said fabric material comprising a blend of polyester staple fibers having an average decitex in the range 2.5 to 4.0 dtex, said impregnant comprising (i) 10 to 35% by dry weight carboxylated styrene-butadiene copolymer in which the styrene content is not less than 55%, (ii) 5 to 10% by dry weight carboxylated styrene butadiene copolymer in which the styrene content is not more than 50%, and (iii) 50 to 70% by dry weight mineral filler.

2. The method according to claim 1 wherein the impregnant comprises: 20 to 30% by dry weight carboxylated styrene-butadiene copolymer in which the styrene content is not less than 55% and 5.5 to 7.5% by dry weight carboxylated styrene-butadiene copolymer in which the styrene content is not more than 50%, and 60 to 70% by dry weight mineral filler.

3. The method according to claim 2 wherein the impregnant also comprises up to 3.5 by dry weight melamine formaldehyde resin.

4. The method according to claim 2 wherein the impregnant also comprises a pigment.

5. The method according to claim 1 wherein the filler is constituted by clay.

6. The method according to claim 1 wherein the fabric sheet material comprises polyester staple fibers of 1.5 to 5 dtex with an average decitex in the order of 3.2 dtex.

7. The method according to claim 1 wherein the fabric sheet material has a weight, prior to impregnation, in the range 0.25 to 0.325 kg/m$^2$ and a thickness in the range 1.0 to 1.65 mm.

8. The method according to claim 1 wherein the fabric sheet material is molded to conform to the shape of the underside of the hood prior to being secured thereto.

9. The method according to claim 1 wherein the fabric sheet material is secured to the hood underside by adhesive bonding.

10. The method according to claim 1 wherein the fabric sheet material is secured to the hood underside by a plurality of clips spaced apart about the periphery thereof.

11. A method of under hood sound-deadening in an vehicle comprising securing to an underside of the vehicle hood a layer of impregnated non-woven fabric sheet material having a weight in the range 0.5 to 0.75 kg/m$^2$ and a density in the range 35 to 425 kg/m$^3$,
    wherein the fabric material comprises a blend of polyester staple fibers having an average decitex in the range 2.5 to 4.0 dtex,
    and wherein the impregnant comprises
    10 to 35% by dry weight carboxylated styrene-butadiene copolymer in which the styrene content is not less than 55%,
    5 to 10% by dry weight carboxylated styrene butadiene copolymer in which the styrene content is not more than 50%, and
    50 to 70% by dry weight mineral filler.

12. The method according to claim 11 wherein the impregnant comprises: 20 to 30% by dry weight carboxylated styrene-butadiene copolymer in which the styrene content is not less than 55%, 5.5 to 7.5% by dry weight carboxylated styrene-butadiene copolymer in which the styrene content is not more than 50%, and 60 to 70% by dry weight mineral filler.

13. The method according to claim 12 wherein the impregnant also comprises up to 3.5 by dry weight melamine formaldehyde resin.

14. The method according to claim 12 wherein the impregnant also comprises a pigment.

15. The method according to claim 11 wherein the filler is constituted by clay.

16. The method according to claim 11 wherein the fabric sheet material comprises polyester staple fibers of 1.5 to 5 dtex with an average decitex in the order of 3.2 dtex.

17. The method according to claim 11 wherein the fabric sheet material has a weight, prior to impregnation, in the range 0.25 to 0.325 kg/m$^2$ and a thickness in the range 1.0 to 1.65 mm.

18. The method according to claim 11 wherein the fabric sheet material is molded to conform to the shape of the underside of the hood prior to being secured thereto.

19. The method according to claim 11 wherein the fabric sheet material is secured to the hood underside by adhesive bonding.

20. The method according to claim 11 wherein the fabric sheet material is secured to the hood underside by a plurality of clips spaced apart about the periphery thereof.

* * * * *